Figure 1:
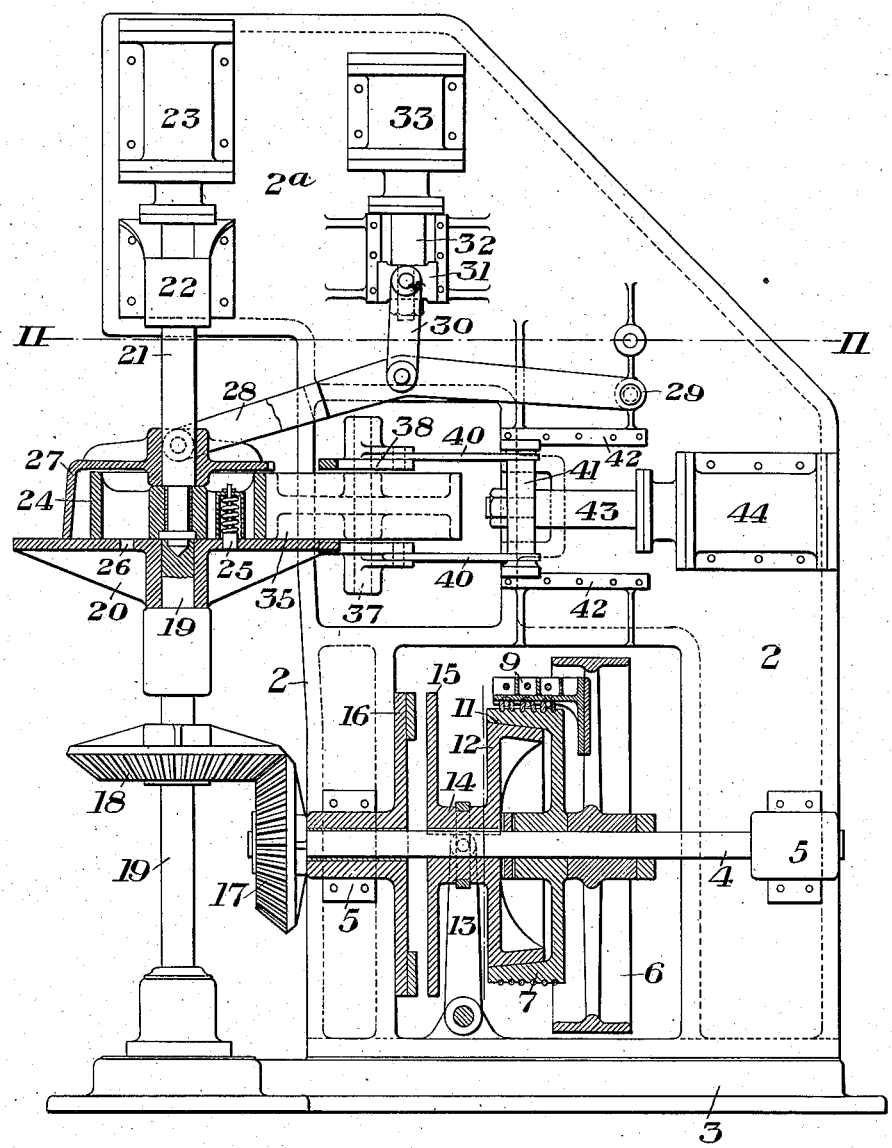

F. H. DANIELS.
REEL FOR COILING FLATS OR OTHER ROLLED SECTIONS.
APPLICATION FILED AUG. 1, 1908.

936,610.

Patented Oct. 12, 1909
2 SHEETS—SHEET 1.

WITNESSES
R H Balderson
W W Swartz

INVENTOR
F. H. Daniels,
by Bakewell, Byrnes Parmelee.
his Attys

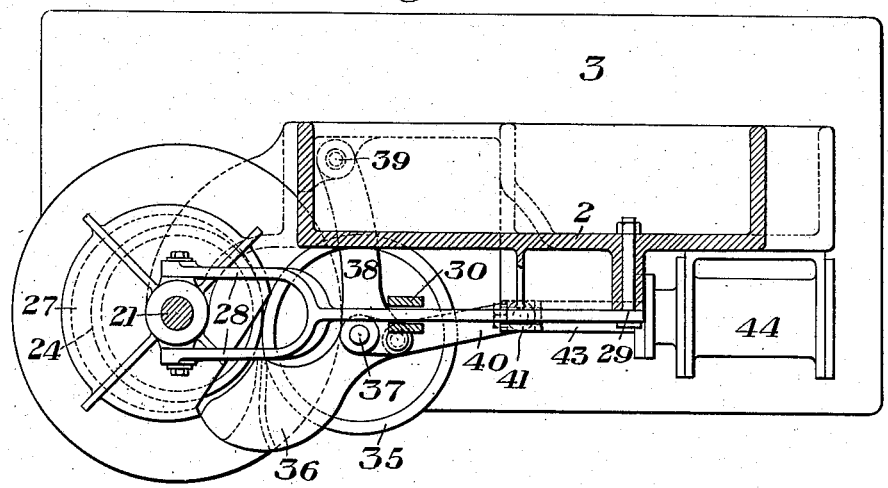
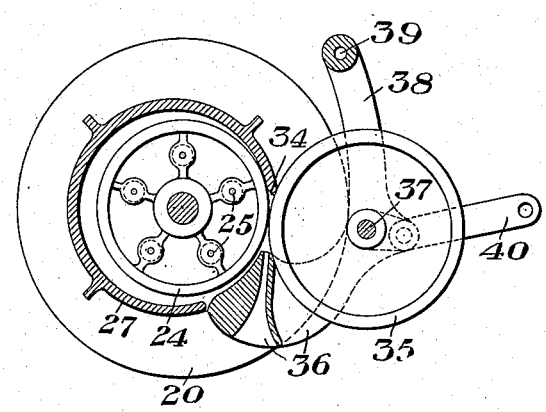
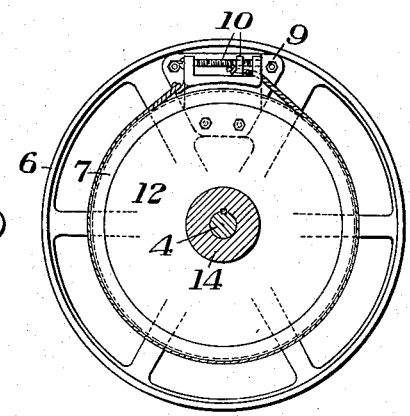

UNITED STATES PATENT OFFICE.

FRED H. DANIELS, OF WORCESTER, MASSACHUSETTS.

REEL FOR COILING FLATS OR OTHER ROLLED SECTIONS.

936,610.  Specification of Letters Patent.  Patented Oct. 12, 1909.

Application filed August 1, 1908. Serial No. 446,421.

*To all whom it may concern:*

Be it known that I, FRED H. DANIELS, of Worcester, in the county of Worcester and State of Massachusetts, have invented a new and useful Reel for Coiling Flats or other Rolled Sections, of which the following is a full, clear, and exact description, reference being had to the accompanying drawings, forming part of this specification, in which—

Figure 1 is a side elevation, partly in section, illustrating one form of reel embodying my invention; Fig. 2 is a section on the line II—II of Fig. 1; and Fig. 3 is a horizontal section, showing the reeling rollers. Fig. 4 is a detail view of a portion of the driving mechanism.

My invention has relation to a machine for coiling or reeling flat bars or rods or other shapes as they come from the rolling mill, and is designed to receive these rods directly without the necessity for their being caught by an attendant, and without any looping out. This permits the reel to be placed close up to the finishing rolls of the mill, with a simple form of guide between the rolls and the reel.

A further object is to provide coiling or reeling apparatus of this character which is simple and efficient in its operation, and which will coil the rolled product, especially flats, into a neat and compact bundle with a minimum of manual labor.

A further object is to provide means whereby the tension of the product being reeled or coiled may be regulated so as to avoid any buckling of the metal in the guide.

The nature of my invention will be best understood by reference to the accompanying drawings, in which I show a preferred form thereof, it being premised, however, that various changes may be made therein by those skilled in the art without departing from the spirit and scope of my invention, as defined in the appended claims.

In these drawings, the numeral 2 designates a frame, which may be of any suitable construction, for supporting the operative parts hereinafter described, and which rests upon a base 3.

4 is a driving shaft mounted in bearings 5 in the lower portion of the frame 2, and which is shown as being arranged to be driven by a belt wheel 6 loosely mounted thereon.

7 is a drum, also loosely mounted on the shaft 4, and which is grooved to receive a series of ropes or cables, one for each groove. The ends of these ropes are attached to opposite sides of a bracket 9 secured to the belt wheel 6, suitable means of any well known character, such as the adjustable screw clamps 10, being provided for adjusting the tension of the ropes or cables. The drum 7 is open at one end, and its interior surface is coned at 11, to fit the correspondingly coned surface of a sliding wheel 12, the said drum and wheel constituting a friction clutch. The wheel 12 is splined to the shaft 4 and is slid endwise thereon by means of a shifting lever 13 engaging its hub 14, and operated in any suitable manner. Formed with, or secured to the hub 14 is a friction plate 15 which, when the wheel is moved out of frictional engagement with the drum 7, is arranged to engage a stationary friction plate 16.

On the inner end of the shaft 4 is a bevel wheel 17, which meshes with a corresponding bevel wheel 18 on a vertical shaft 19. Keyed or otherwise fixed to the upper end portion of this vertical shaft 19 is a circular reel plate 20.

21 is a spindle placed in vertical alinement with the shaft 19, and centered at its lower end in a central hole in said shaft. This spindle is provided with a bearing 22 in the overhung portion 2ª of the frame 2. The spindle 21 can be raised and lowered by any suitable means, such as the power cylinder 23, mounted on the overhanging frame portion 2ª, the spindle having a piston on its upper end working in said cylinder.

24 is a feed roll, which is loosely mounted on spindle 21 and may be moved vertically thereby. This roll 24 when moved down upon the driving plate 20, is driven therefrom by means of one or more spring-actuated pins 25 which engage a circular row of apertures 26 in the driving plate.

27 is an eccentric hollow guide, which is loosely sleeved on the spindle 21, and surrounds the roll 24. This guide 27 may be moved vertically into and out of operative relation with the roll 24 by any suitable means, such as the forked lever 28, pivoted to the frame at 29 and having an actuating connection 30 with a cross-head 31 carried by the piston rod 32 of a power cylinder 33 mounted on the upper portion of the frame 2. The guide 27 is arranged eccentrically with respect to the roll 24 in the manner shown in Figs. 2 and 3, and is cut away at one side, as shown at 34 in Fig. 3, to receive a pressure roller 35 and also the flat guide 36. The roller 35 and guide 36 are mounted on a stud shaft 37, carried by an arm 38, which is pivoted to the frame at 39 so as to permit said frame, together with the roller 35, to move toward and away from the roll 24. The wheel or roller 35 is normally pressed toward the feed roll 24 by link connection 40 with a cross-head 41, which moves in guides 42, and is actuated by the rod 43 of a power cylinder 44. The guide 36 has an inwardly tapered slot with a closed top of proper size to suit the particular size of flat to be coiled, its function being not only to guide the flats in a horizontal plane, but also in a vertical plane, especially at the time the guide 27 is raised in the manner hereinafter described. At this time the closed top of the guide 36 will act to prevent the flat from being lifted up near the point of contact between the feed rollers 24 and 35. The guideway 27 is also preferably tapered upwardly somewhat, being of increasing width toward its lower edge, so as to readily free it from the flat when it is lifted.

The operation is as follows: As shown in the drawings, the parts are in position for receiving a flat as it comes directly from the rolling mill through a suitable twist guide. The end of the flat enters the guideway 36 and passes between the feed rollers 24 and 35. These rollers engage the material, and roll 24 pushes it around in a circle inside of the guide 27. As soon as one complete wrap has been made in this way within the guide 27, this guide is raised quickly away from said wheel, so as to allow for the increasing size of the coil. During the coiling operation the feed roller 35 is constantly forced against the coil by the action of the power cylinder 44 and is driven by its contact with the material. The speed of the feed roller 24 is regulated so as to be slightly in excess of the speed of the piece as it leaves the mill, so as to avoid any tendency to buckle in the guide, and the roll 24 serves as a mate for pressure roller 35 to feed and force the flat into guide 27 and form the coil. The coil when formed does not wrap closely around roll 24 but is free from it, owing to the eccentricity of guide 27. When the coil is completed, the roller 35, together with the guide 36 are moved back by means of the cylinder 44, and the roll 24 is then lifted from the coil by the cylinder 23. When the roll 24 is raised, the coil remains on the driving plate 20, and is afterward removed. As soon as the pins 25 are disengaged from the driving plate 20, the rotation of the feed roll 24 stops. By varying the tension on the ropes or cables 8, the pull on the flat coming from the mill can be so adjusted as to suit the different widths and thicknesses of flats, and other varying conditions. When the clutch wheel 12 is disengaged from the drum 7, the coaction of the friction plates 15 and 16 stops the reel.

It will be noted that the entering end of the flat follows around within the guide 27 until it again passes between and is gripped by the feed rollers 24 and 35. As the coil increases in diameter the guide 36 will swing outwardly faster than the roller 35, owing to its being farther from the center 39. This gives the coil an opportunity to bulge out behind the guide 36, should any time be lost in lifting the guide 27 out of the way. The shape and movement of the guide 27 may also be changed; for example instead of being lifted it can be made in halves which are moved sidewise toward and from each other by suitable mechanism. My design also permits the use of more than one pressure roller 35 if found more convenient. In this case, guide 27 would be designed accordingly.

Although these specifications describe a reel suitable for reeling flat bars or rods, I do not limit my invention to rectangular sections. It is clear that the reel will equally well coil any other rolled section, such as rounds or squares. For this purpose the pressure rollers 35 and 24 may be provided with suitable grooves, or otherwise shaped to fit the rolled section. The material may be coiled either hot or cold.

The advantages of my invention will be apparent to those skilled in the art, since it provides a simple apparatus by which flats, or other rolled sections as they come directly from the finishing rolls of the rolling mill, may be coiled into a neat and compact bundle, with a minimum of manual labor, and without the necessity for looping out.

It will be obvious that various changes may be made in the apparatus and its connections. Thus, instead of the power cylinders, 23, 33, and 44, any other suitable motive devices or actuating means may be provided for operating the parts controlled by these cylinders. Various other driving connections for the reel may also be employed, without in any way affecting the invention.

I claim:

1. In a reel, a horizontal support for the coil during its formation, a removable guide adjacent to said support and arranged to shape the coil within it, co-acting pressure rolls for feeding the rolled section into the guide, one of said rolls being within the guide and mechanism for moving the guide from its guiding and forming position; substantially as described.

2. In a reel, a rotary coil support, coacting pressure rolls for feeding the rolled section forward upon the support, one of said rolls acting as a coiling drum, a guide inclosing the last named roll and arranged to form the first coil on the support, and actuating connections arranged to move the guide toward and from operative relation with the rotary support, substantially as described.

3. In a reel, a horizontal support for the coil as it is formed, a movable guide adjacent to the support, and arranged to shape the coil within such guide, means for feeding the rolled section to be coiled into the guide, and means for moving the guide vertically into and out of its coiling position, substantially as described.

4. In a reel, a pair of feed rollers having their axes extending in a vertical direction, a coiling guide partially surrounding one of said rollers, a support adjacent to the last named roller and on which the coil is formed as it passes between the guide and the roller within the same, and actuating connections for moving the coiling guide toward and from its coiling position; substantially as described.

5. In a reel, a rotary plate or support, a feed roll movable toward and from the support and having connections with the support arranged to drive it when in coiling position, said feed roll and the support being constructed and arranged with respect to each other to permit of their separation to permit the removal of the formed coil, and at least one other feed roller arranged to coact with the first mentioned feed roll, a guide partially surrounding the roll, and connections for moving the guide toward and from the support, substantially as described.

6. In a reel, a rotary support upon which the coil is formed, a feed roll movable toward and away from the support and having connections with the support for driving the roll when in its coiling position, a guide to shape the coil partially surrounding the feed roll and arranged to be positioned in coöperative relation with the same and with the rotary support, feeding means co-acting with said feed roll, means for moving the guide into and out of its coiling position during the initial portion of the coiling operation, and means for moving the feed roll away from the support after the completion of a coil to permit the removal of the coil, substantially as described.

7. In a reel, a feed roll and coiling guide partially surrounding the same, a support in coöperative relationship with the feed roll and guide and on which the coil is formed, means for moving the guide toward and from coiling position, a feed roller coacting with the roll, means for driving one of said feed members and means for pressing the outer feed roller toward the feed roll; substantially as described.

8. In a reel, a support for the coil during its formation, a pair of feed rollers having vertically extending axes, one being positioned upon said support, a movable element upon which the other feed roller is mounted to move toward and away from its companion roller, means acting to press the movable roller toward its companion roller, a coiling guide surrounding the said companion roller and adapted to shape the coil within said guide, and another guide for leading the material to be coiled to the bite of the feed rollers, substantially as described.

9. In a reel, a pair of feed rollers, a movable element upon which one of said rollers is mounted to move toward and away from the other roller, means for normally pressing the movably mounted roller toward the other roller, a coiling guide surrounding the relatively stationary roller, and a further guiding device adjacent to the feed rollers having means for limiting deflection of the material being coiled in the direction of the axes of the rollers, substantially as described.

10. In a reel, a pair of feed rollers, a rotary plate carrying one of said feed rollers, said plate being in position to receive and support the coil as it is formed around the feed roller which it carries, a guide partially surrounding said plate roll, connections for moving the guide toward and from the plate and mechanism for pressing the other feed roller toward the plate roll; substantially as described.

11. In a reel, a rotary support, a feed roll mounted on the support and having a clutch connection therewith, connections for moving the roll toward and away from the support, a coiling guide arranged to be brought into position to partially surround the feed roll when the latter is in operative connection with the support, connections for moving the guide into and out of its operative position, another feed roll, and means for pressing the last named feed roll toward the first named feed roll, substantially as described.

12. In a reel, the combination with reeling or coiling devices, and means for feeding the material to be coiled thereto, of a driving shaft for the feeding means, a clutch through which the shaft is driven, a constantly acting driving element for one member of the clutch, and means whereby the driving effort exerted by the said element upon the driving member of the clutch may be varied to vary the speed of the driving shaft independently of the clutch; substantially as described.

13. In a reel, a pair of feed rollers, a rotary coil support, a guide arranged to surround one of said rollers in starting a coil and to be moved into and out of operative relation to the coil support, and means for so moving said guide, the roller which is surrounded by the guide having a driving connection with the support, and means for moving said roller into and out of position to effect such driving connection, substantially as described.

14. In a reel, a rotary coil support, a feed roll having clutch connection therewith, connections for moving the roll toward and from the support, a coiling guide partially surrounding the roll, and adapted to be brought into coöperative relationship with the support when the feed roll is in operative connection with the support, connections for moving the coiling guide toward and from its operative position, a movable element adjacent to the support and carrying another feed roll coacting with the first named roll, an entering guide carried on the movable element and connections for pressing said element toward the first named roll, while allowing enlargement of the coil during coiling; substantially as described.

In testimony whereof, I have hereunto set my hand.

FRED H. DANIELS.

Witnesses:
A. F. BACKLIN,
GEO. SIEURIN.